US007308809B2

(12) United States Patent
Lu

(10) Patent No.: US 7,308,809 B2
(45) Date of Patent: Dec. 18, 2007

(54) MULTI-FUNCTIONAL COMPUTER LOCK

(75) Inventor: Francisco Lu, Kaohsiung (TW)

(73) Assignee: Miz Engineering, Ltd. (TW)

( * ) Notice: Subject to any disclaimer, the term of this patent is extended or adjusted under 35 U.S.C. 154(b) by 0 days.

(21) Appl. No.: 11/511,949

(22) Filed: Aug. 28, 2006

(65) Prior Publication Data

US 2007/0245778 A1   Oct. 25, 2007

(30) Foreign Application Priority Data

Apr. 21, 2006  (TW) .............................. 95114288 A

(51) Int. Cl.
*E05B 69/00* (2006.01)
*E05B 73/00* (2006.01)
(52) U.S. Cl. ...................... 70/58; 70/14; 70/18; 70/49; 70/57
(58) Field of Classification Search .................... 70/18, 70/58, 57, 14, 19, 30, 49
See application file for complete search history.

(56) References Cited

U.S. PATENT DOCUMENTS 5,875,657 A * 3/1999 Kelley ............................ 70/18
5,913,907 A * 6/1999 Lee ................................ 70/58
6,601,416 B1 * 8/2003 Sanders ......................... 70/58
6,622,532 B2 * 9/2003 Hsu ............................... 70/14
6,686,376 B2 * 2/2004 Bonjouklian et al. ....... 514/312
6,923,027 B1 * 8/2005 Kuo ............................... 70/49
2005/0262904 A1 * 12/2005 Ling et al. .................... 070/49

* cited by examiner

*Primary Examiner*—Jennifer H. Gay
*Assistant Examiner*—Alyson Merlino
(74) *Attorney, Agent, or Firm*—Darby & Darby PC

(57) ABSTRACT

A computer lock includes a housing having a groove opening at an outer surface thereof to receive an end of a fastening cable and/or a part of a computer. An actuator is disposed in the housing and actuated by a lock assembly disposed inside the housing so as to move toward the locking groove when the lock assembly is in a locking position. The actuator has a moving seat, a penetrating pin, and a push pin. The penetrating pin extends into the locking groove and engages the end of the fastening cable and/or the part of the computer received in the locking groove when the lock assembly is in the locking position. An anchor unit is disposed in the housing and controlled by the push pin to interlock with a hole of the computer.

11 Claims, 17 Drawing Sheets

MULTI-FUNCTIONAL COMPUTER LOCK

CROSS-REFERENCE TO RELATED APPLICATION

This application claims priority of Taiwanese Application No. 095114288 filed on Apr. 21, 2006.

BACKGROUND OF THE INVENTION

1. Field of the Invention

The invention relates to a lock, more particularly to a multi-functional computer lock.

2. Description of the Related Art

It is known to provide computer locks for preventing the loss and theft of computers and peripheral devices. Referring to FIGS. 1 and 2, there is shown a conventional computer lock 2 that can be used to lock a desktop computer 20 by combining with a fastening cable 23 and to tie wires of peripheral devices, such as mouse and keyboard devices. The desktop computer 20 has a locking lug 201. The fastening cable 23 has a head 231 and a cable 232. The computer lock 2 has a lock case 21 and a key-operated lock unit 22 disposed in the lock case 21.

The lock case 21 has a first compartment 212 to receive the key-operated lock unit 22, a second compartment 213 to receive the locking lug 201 of the computer 20, a first groove 214 to engage the head 231 of the fastening cable 23, and a second groove 215 to receive a wire from a mouse. The size of the second groove 215 is smaller than that of a plug of the mouse. The key-operated lock unit 22 has a lock shell 221 fixed in the first compartment 212, and a lock stem 222 inserted into the lock shell 221 and extendable into the second compartment 213.

In use, the head 231 of the fastening cable 23 is placed in the first groove 214, whereas the locking lug 201 of the computer 20 is received in the second compartment 213. When the lock stem 222 is pressed, the computer 20 and the fastening cable 23 are locked. When the key-operated lock unit 22 is unlocked using a key, the lock stem 22 is released from the locking lug 201 so that the computer lock 2 can be removed from the computer 20.

While the computer lock 2 can be used to lock a desktop computer 20 or a peripheral device that has the locking lug 201 as mentioned above, application thereof is limited. If it is necessary to lock a notebook computer 3 having a locking hole 31 as shown in FIG. 3, an additional computer lock suitable for the notebook computer 3 must be provided. Therefore, users need to buy different types of computer locks to lock different types of computers.

SUMMARY OF THE INVENTION

Therefore, an object of the present invention is to provide a multi-functional computer lock that can accommodate different types of computers and peripheral devices.

According to this invention, a computer lock comprises: a housing having first and second compartments disposed within the housing and communicated with each other, and a locking groove opening at an outer surface of the housing and adapted to receive an end of the fastening cable and/or a part of a computer; a lock assembly disposed in the first compartment and being operable by a key to move between locking and unlocking positions; and an actuator disposed movably in the second compartment and actuated by the lock assembly to move toward the locking groove when the lock assembly is in the locking position. The actuator includes a moving seat, and a penetrating pin and a push pin projecting from the moving seat. The penetrating pin extends into the locking groove from the second compartment when the lock assembly is in the locking position and is adapted to engage the end of the fastening cable and/or the part of the computer received in the locking groove. The computer lock further includes an anchor unit that is disposed in the second compartment, that projects outwardly from the second compartment, and that is adapted to interlock with a hole of a computer. The anchor unit is controlled by the push pin to interlock with the hole of the computer when the lock assembly is in the locking position.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
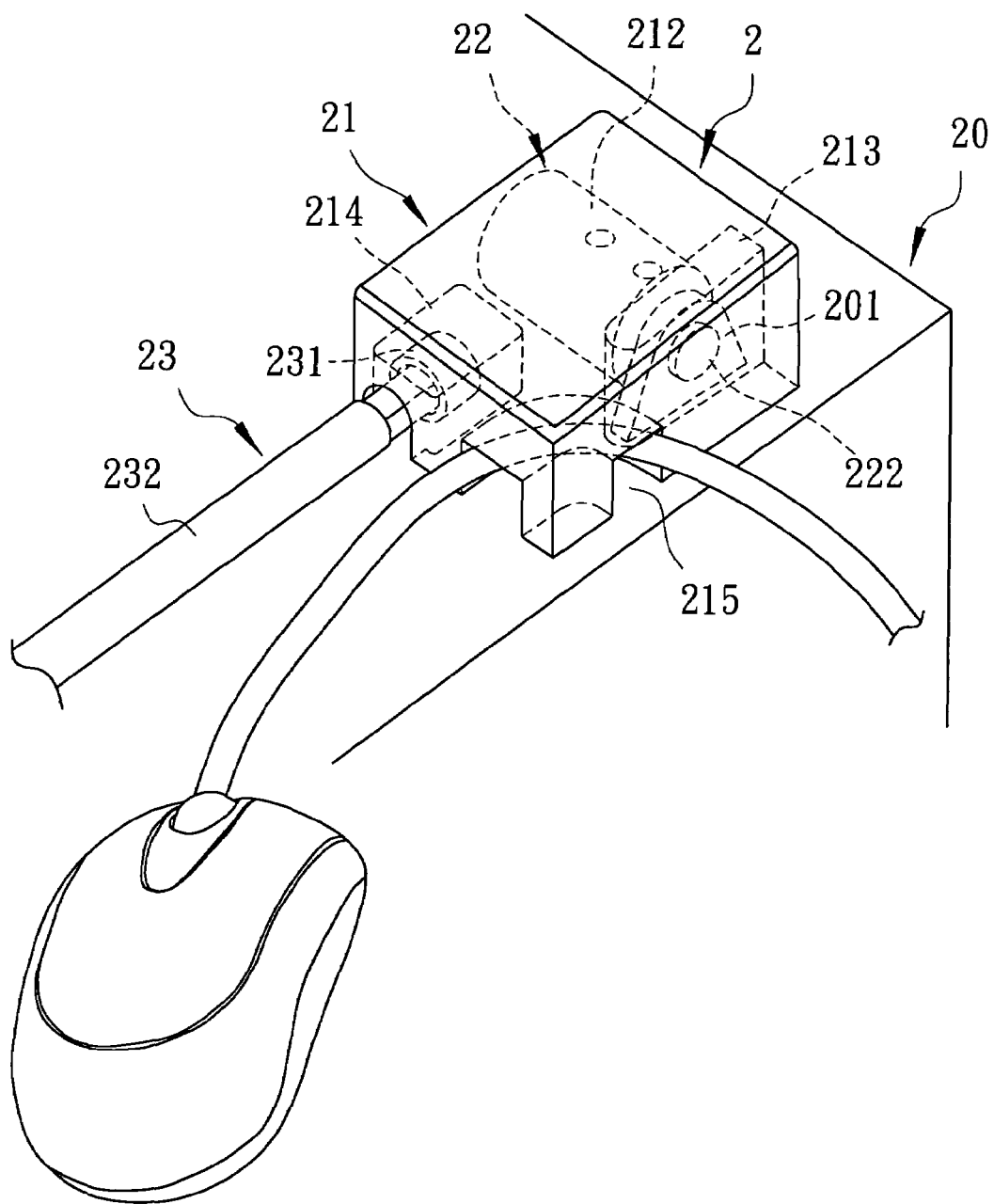
FIG. 1 shows a conventional computer lock.
Figure 2:
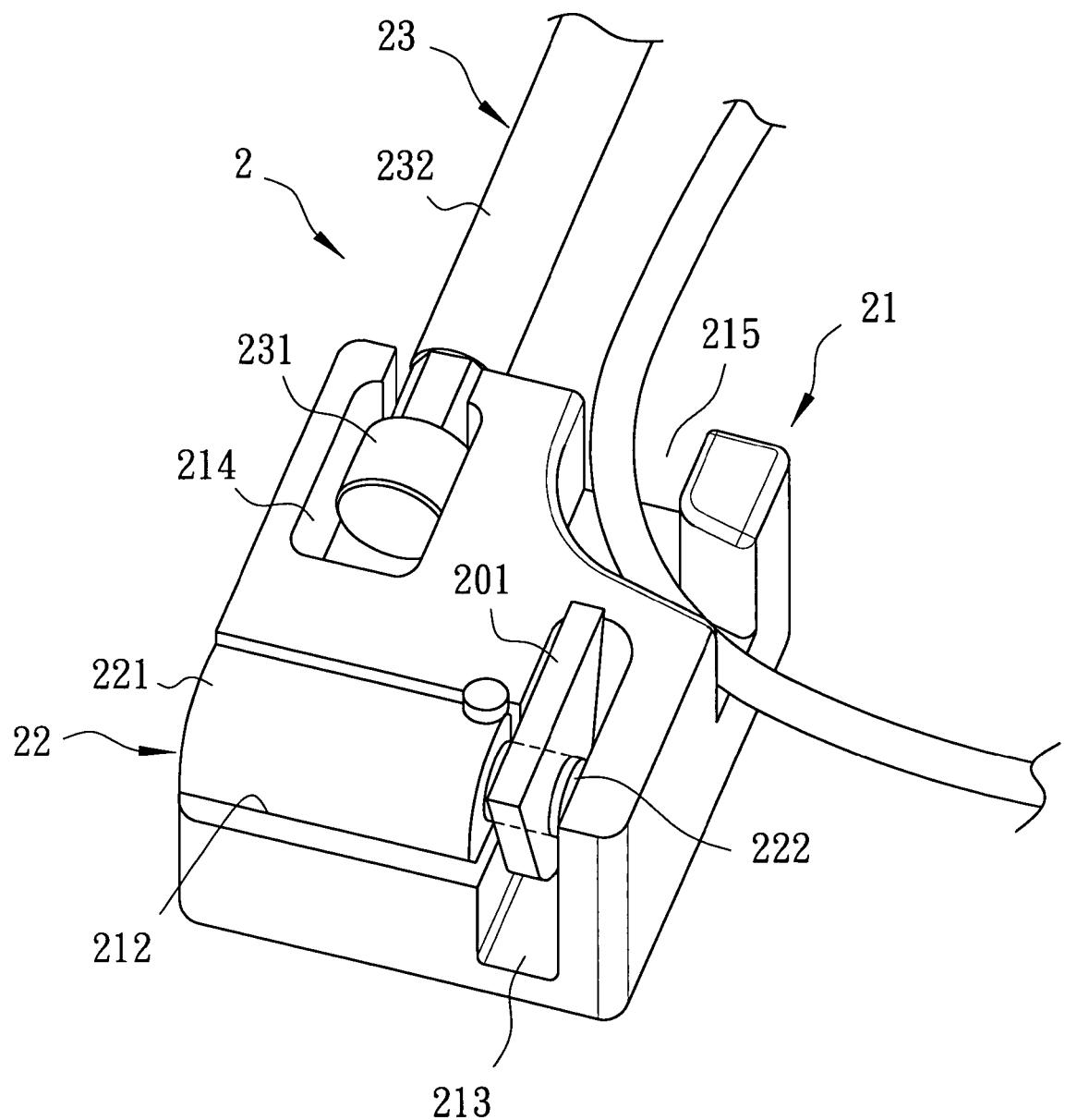
FIG. 2 shows that the conventional computer lock of FIG. 1 is inverted.

Before the present invention is described in greater detail, it should be noted that like elements are denoted by the same reference numerals throughout the disclosure.

Figure 3:
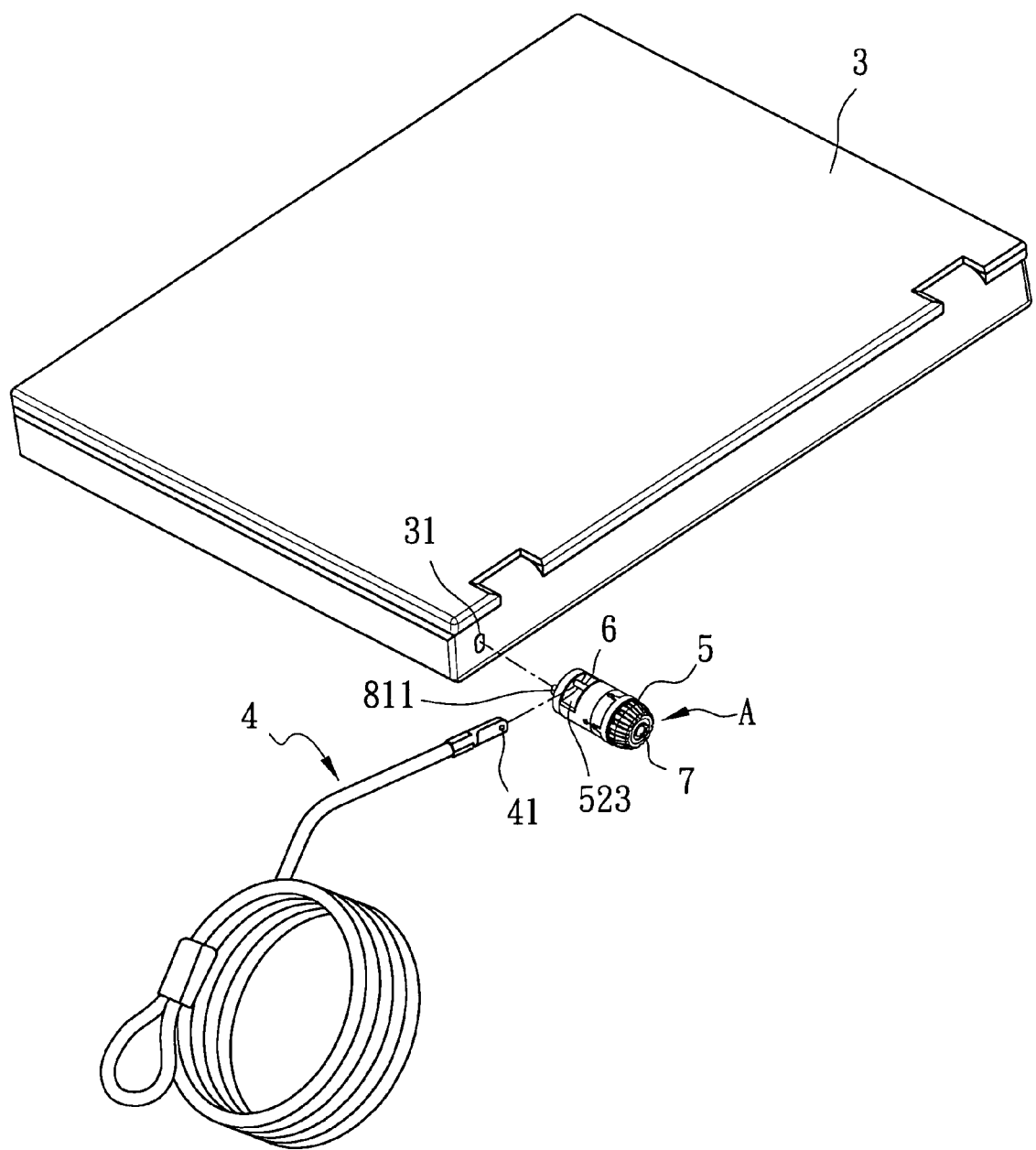
FIG. 3 is a perspective view showing the first preferred embodiment of a computer lock according to the present invention, and a notebook computer to be locked.
Figure 4:
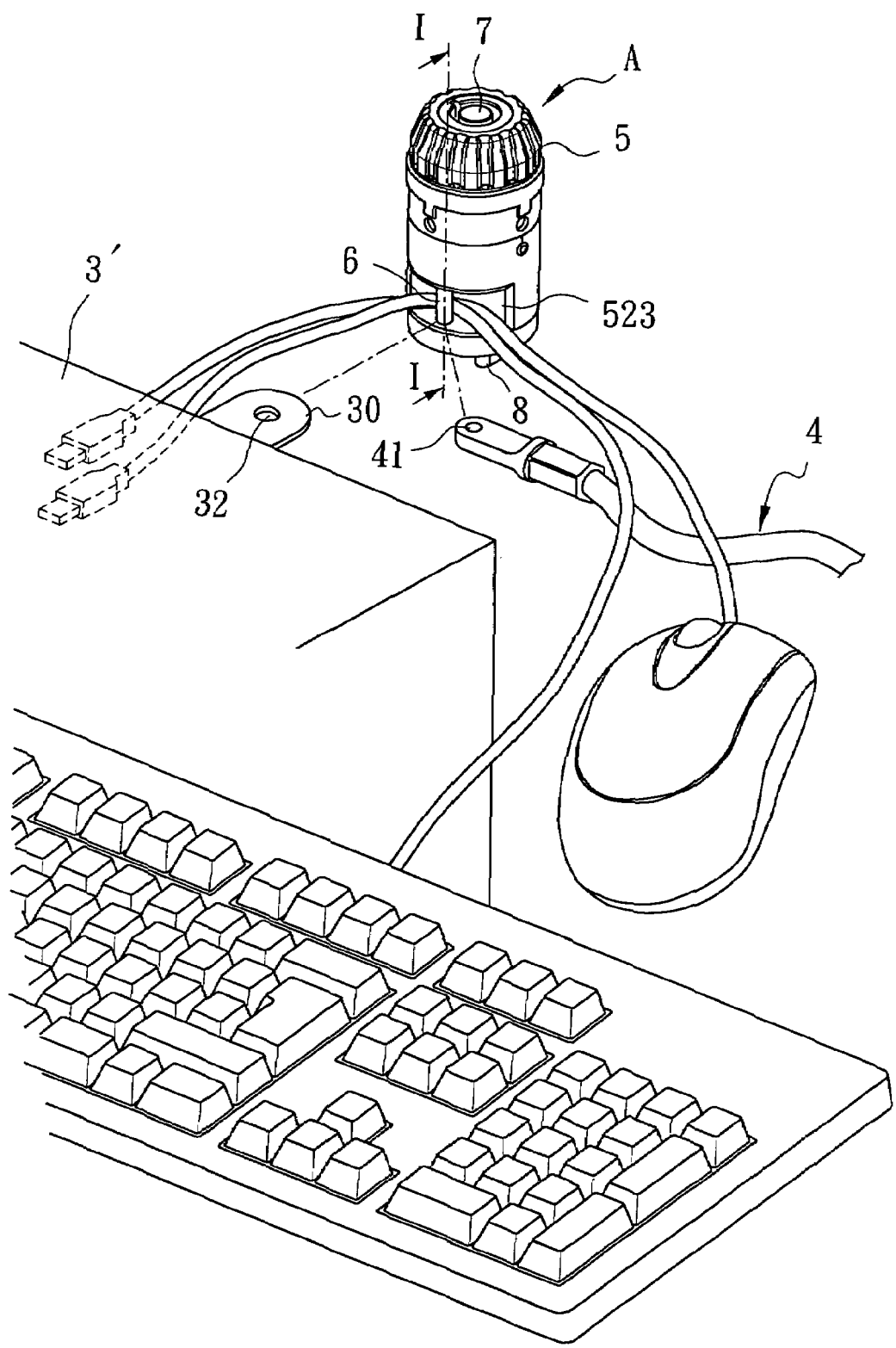
FIG. 4 is a perspective view showing the first preferred embodiment, and a desktop computer to be locked.

Referring to FIGS. 3 and 4, there is shown a first preferred embodiment of a computer lock (A) according to the present invention, which can be used to connect and lock a notebook computer 3 or desktop computer 3' together with a fastening cable 4, and which can also serve to tie together wires of a peripheral device, such as a mouse and a keyboard. The notebook computer 3 has a hole 31, the desktop computer 3' has a lug 30 provided with a hole 32, and the fastening cable 4 has an end formed with a hole 41. The computer lock (A) may also be used to lock peripheral devices, such as a monitor, a printer, a scanner, a projector, etc. The computer lock (A) includes a housing 5, an actuator 6, a lock assembly 7 and an anchor unit 8.

Figure 5:
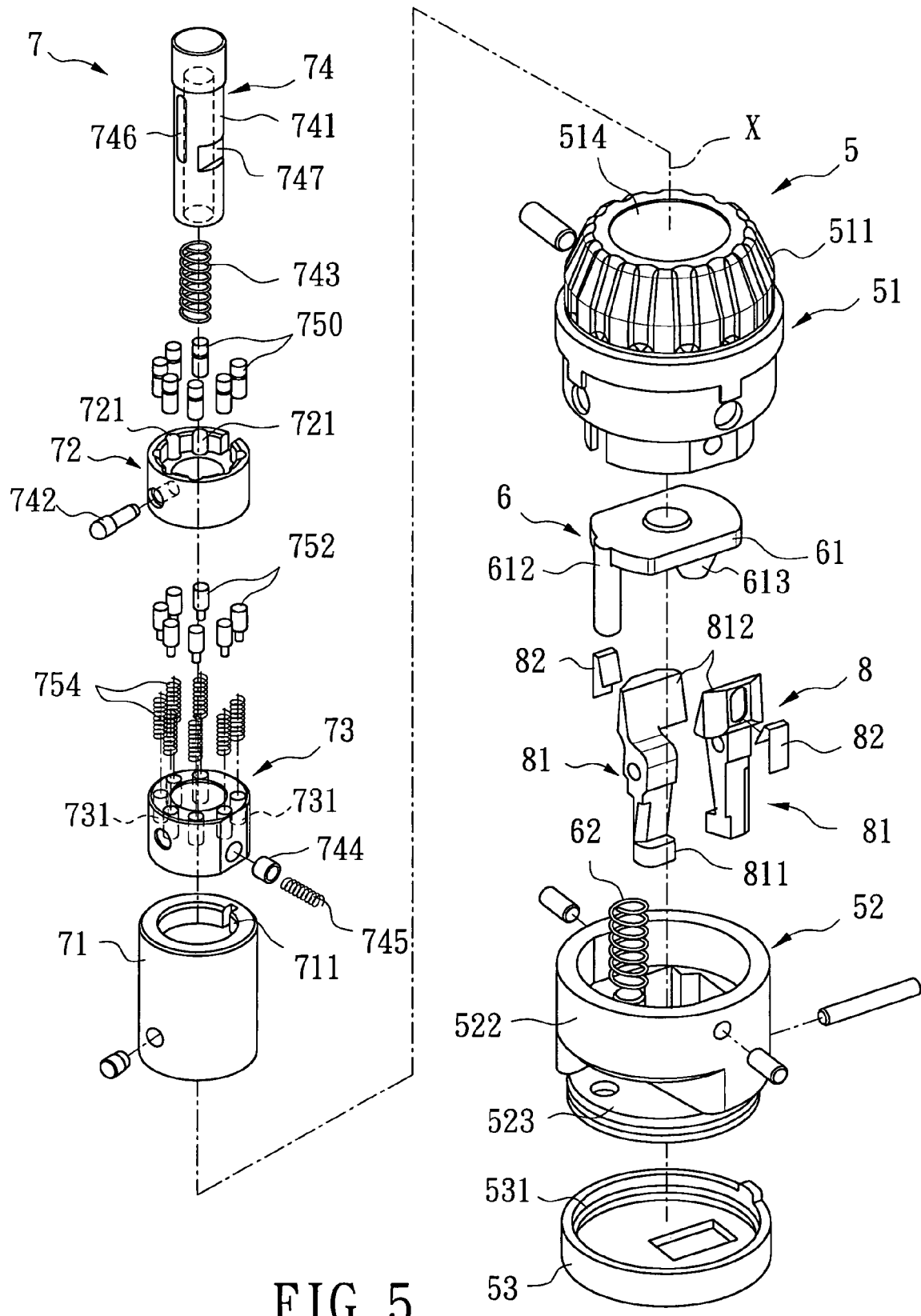
FIG. 5 is an exploded view of the first preferred embodiment.
Figure 6:
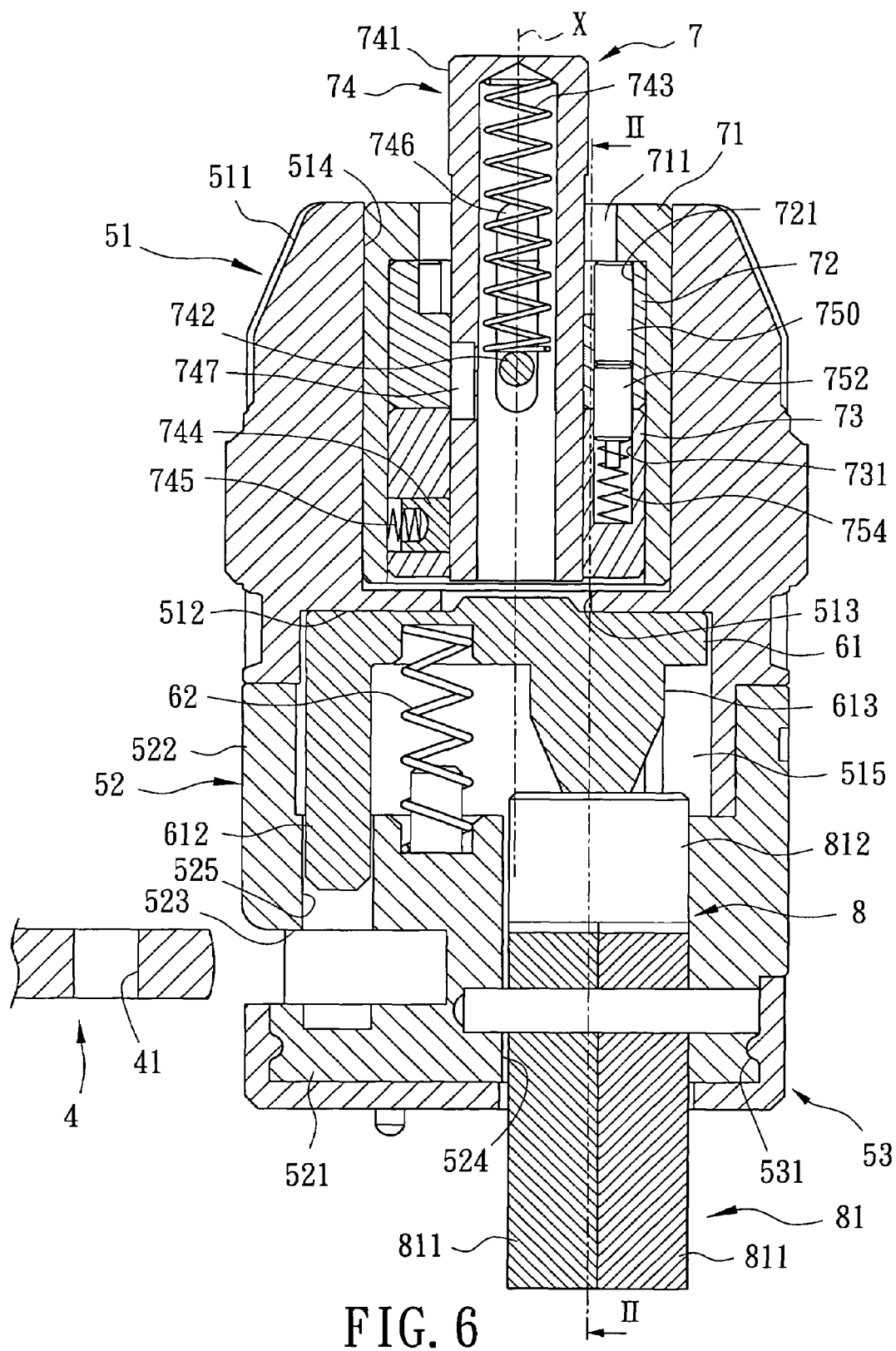
FIG. 6 is a sectional view taken along line I-I of FIG. 4.

Referring to FIGS. 5 and 6, the housing 5 includes first and second shells 51 and 52, and a cap 53 sleeved onto the second shell 52. The first shell 51 has a first surrounding wall 511, and a partition 512 projecting inward from an inner side of the first surrounding wall 511 and defining a slot 513. The first surrounding wall 511 confines first and second compartments 514, 515 separated by the partition 512 and intercommunicated through the slot 513. The first compartment 514 receives the lock assembly 7, whereas the second compartment 515 receives the actuator 6.

The second shell 52 has a base wall 521, and a second surrounding wall 522 extending from the base wall 521 to the first surrounding wall 511 and interlocking with the first surrounding wall 511. The second compartment 515 is thus closed by the base wall 521 and the second surrounding wall 522. The base wall 521 has a locking groove 523 formed therein in communication with the second compartment 515 and opening at one side of the base wall 521, a through bore 524 communicated with the second compartment 515 and extending through an outer surface of the base wall 521 proximate to the other side of the base wall 521, and a passage hole 525 formed in the base wall 521 and extending in the same direction as the through bore 524. The locking groove 523 extends transversely of and intersects the passage hole 525.

The actuator 6 includes a moving seat 61 disposed movably within the second compartment 515, and an actuator spring 62. A penetrating pin 612 and a push pin 613 projects from the moving seat 61 toward the base wall 521. The penetrating pin 612 is extendable into the locking groove 523 from the second compartment 515 through the passage hole 525. The actuator spring 62 is disposed between the moving seat 61 and the base wall 521. The moving seat 61, the penetrating pin 612 and the push pin 613 are formed as one piece in this embodiment. However, it is contemplated that the aforesaid components can be separate pieces that are assembled together. The actuator spring 62 is a compression spring and has two ends respectively engaged in the moving seat 61 and the base wall 521.

The lock assembly 7 includes a key-operated lock body that includes a lock shell 71 inserted in the first compartment 514, rotary and stationary cores 72 and 73 disposed within the lock shell 71, a plurality of first and second tumbler pins 750, 752, and a plurality of tumbler springs 754. A lock stem 74 extends through the rotary and stationary cores 72, 73 to move the moving seat 61.

The lock shell 71 has a key hole 711 opposite to the base wall 521. The rotary core 72 is rotatable relative to the lock shell 71 and adjacent to the keyhole 711. The rotary core 72 has a plurality of pin holes 721 each receiving one of the first tumbler pins 750 and one of the second tumbler pins 752. The stationary core 73 has a plurality of pin holes 731 receiving the tumbler springs 754, respectively.

The lock stem 74 has a hollow stem 741, a longitudinal slide slot 746, and a retaining groove 747. A coupling pin 742 extends from the rotary core 72 into the slide slot 746. A returning spring 743 is inserted into the hollow stem 741 and abuts against the coupling pin 742 so that the hollow stem 741 is biased to move outward from the lock shell 71. A retaining pin 744 projects from the stationary core 73 to engage the retaining recess 747 of the lock stem 74. A spring 745 is provided between the retaining pin 744 and the lock shell 71 to bias the retaining pin 744 to move toward the lock stem 74.

The anchor unit 8 includes two anchor arms 81 that are connected pivotally to each other and to the base wall 521 in the through bore 524, and a pair of biasing springs 82 each disposed between one of the anchor arms 81 and the second surrounding wall 522 to bias the anchor arms 81. Each anchor arm 81 has a hook end 811 extending outward through the through bore 524, and an opposite driven end 812. The anchor arms 81 are pivoted to each other at a location between the hook ends 811 and the driven ends 812 of the anchor arms 81. The driven ends 812 are biased by the respective biasing springs 82 so that the hook ends 811 are moved toward each other to a closing or unlocking position.

Figure 7:
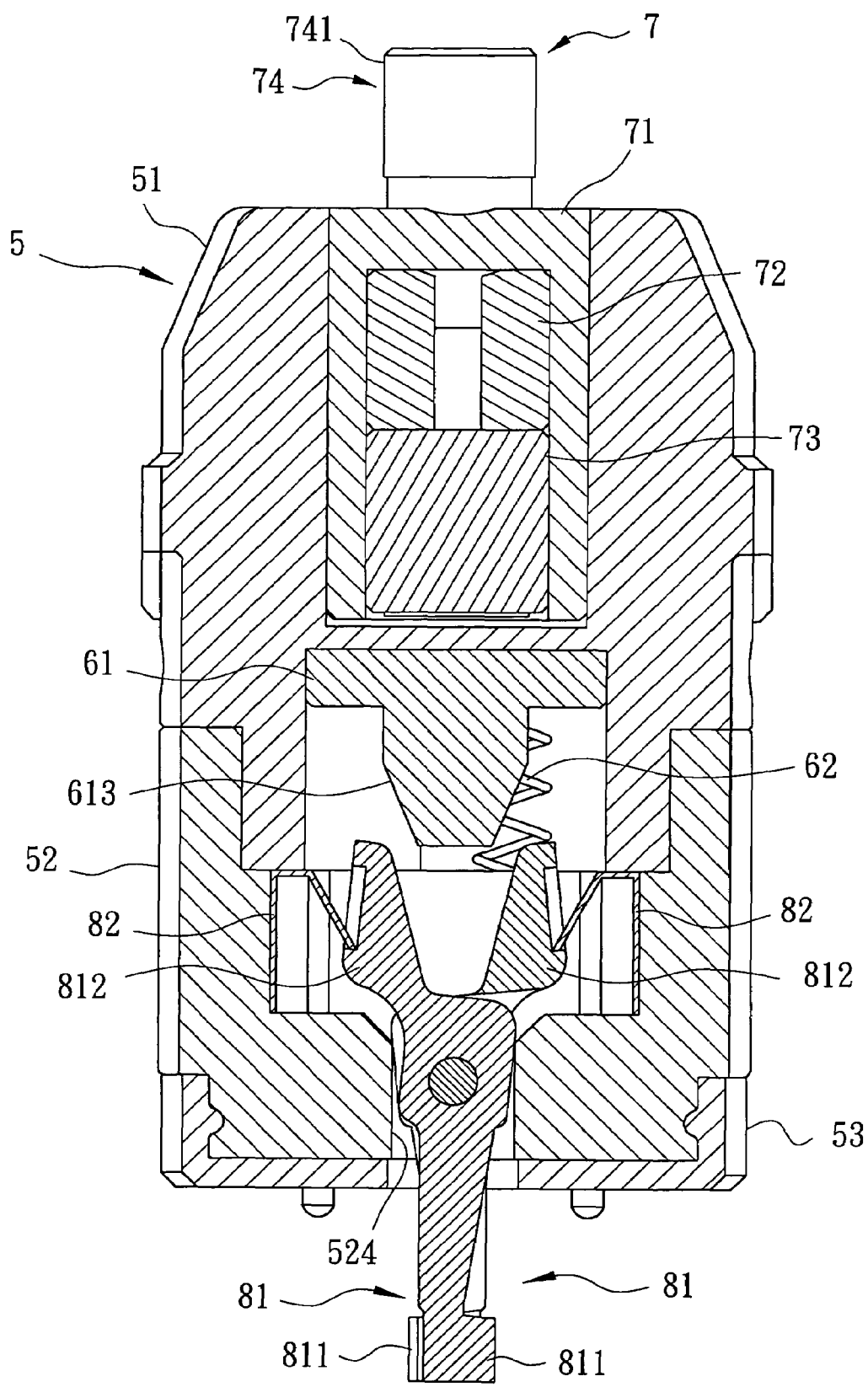
FIG. 7 is a sectional view taken along line II-II of FIG. 6.

Referring to FIGS. 6 and 7 in combination with FIG. 3, when the computer lock (A) is in an unlocking position, the lock stem 74 is moved out of the lock shell 71 by the action of the returning spring 743, and the moving seat 61 is biased by the actuator spring 62 to move toward the lock assembly 7. In this state, the penetrating pin 612 is moved away from the locking groove 523, and the push pin 613 is moved away from the anchor arms 81.

Figure 8:
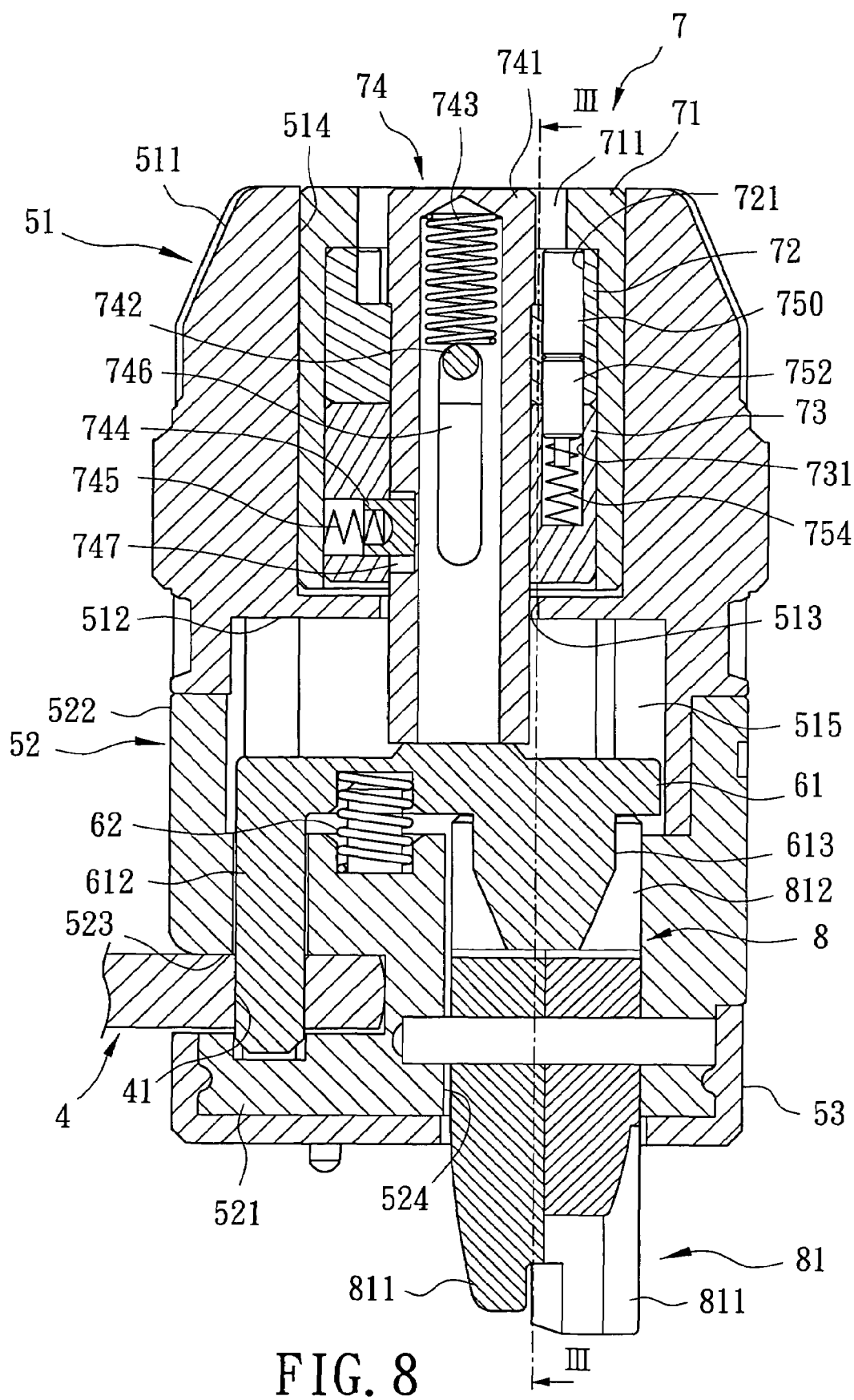
FIG. 8 is the same view as FIG. 6 but with a push pin extending between driven ends of anchor arms.
Figure 9:
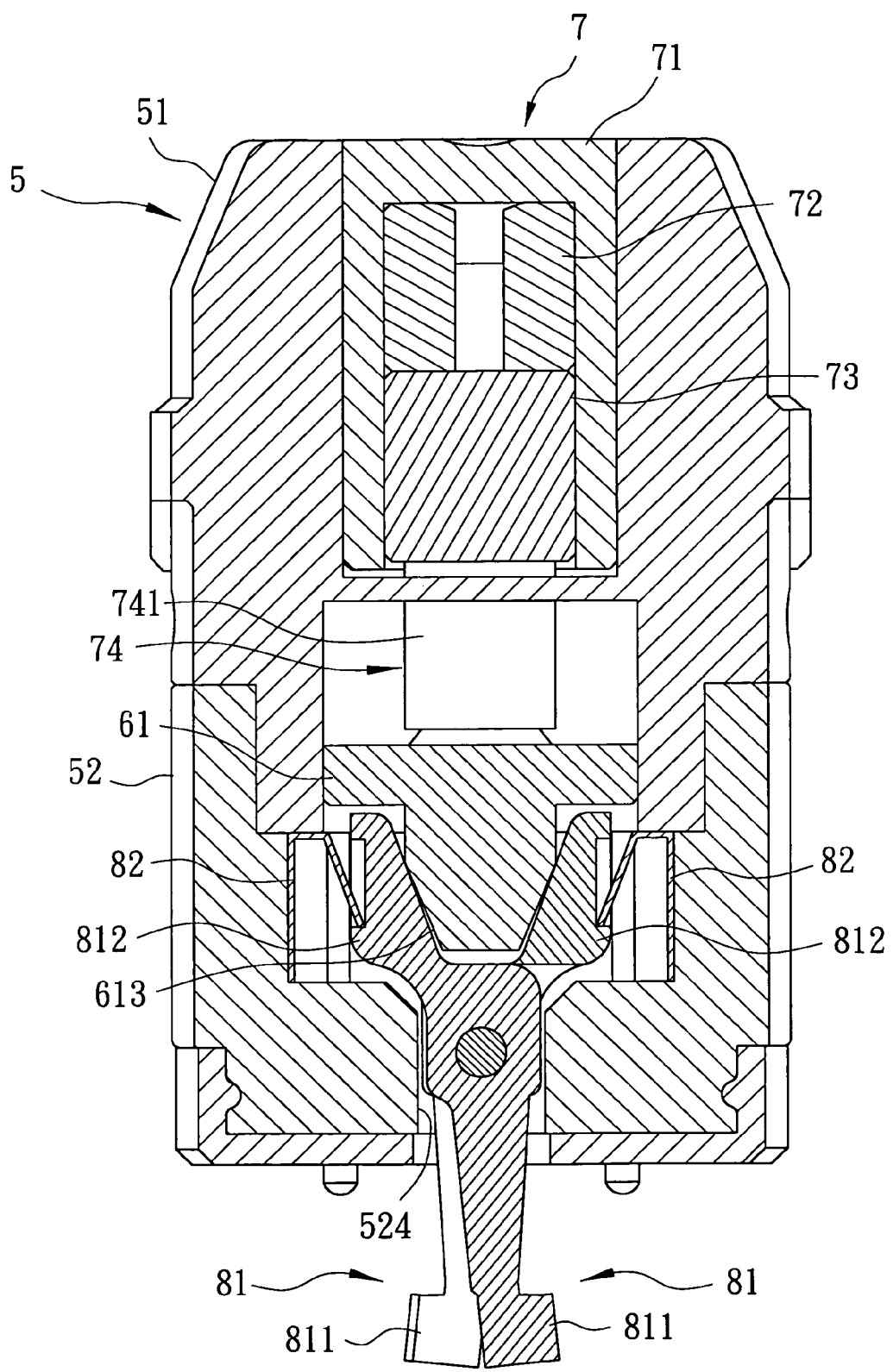
FIG. 9 is a sectional view taken along line III-III of FIG. 8.

Referring to FIGS. 8 and 9 in combination with FIGS. 5 and 6, the lock stem 74 is pressed inward, and the moving seat 61 is moved toward the base wall 521. When the retaining pin 744 engages the retaining groove 747 to stop movement of the lock stem 74, the lock assembly 7 is in a locking position, the push pin 613 extends in between the driven ends 812 of the anchor arms 81 and moves the hook ends 811 away from each other, and the penetrating pin 612 extends into the locking groove 523. Prior to pressing the lock stem 74, if the end of the fastening cable 4 is inserted into the locking groove 523, and if the hook ends 811 of the anchor arm 81 are inserted into the hole 31 of the notebook computer 3 shown in FIG. 3, the penetrating pin 612 will extend through the through hole 41 of the cable 4 so that the cable 4 is secured to the computer lock (A), and the hook ends 811 will be engaged firmly in the hole 31 of the notebook computer 3. The computer lock (A) may also be used to lock a desktop computer 3' shown in FIG. 4. When the end of the cable 4 and the lug 30 of the desktop computer 3, are inserted into the locking groove 523, the penetrating pin 612 will extend through the holes 41 and 32 of the cable 4 and the lug 30.

When a key (not shown) is inserted into the keyhole 711, the first and second tumbler pins 750, 752 are moved in the pin holes 721, 731. When all the second tumbler pins 752 are pushed into the pin holes 731, the rotary core 72 can be rotated by the key. When the rotary core 72 is rotated, the lock stem 74, which is coupled to the rotary core 72 through the coupling pin 742 is rotated so that the retaining pin 745 is moved away from the retaining groove 747 and the lock stem 74 is biased by the returning spring 743 to move outward. At the same time, the moving seat 61 is biased by the actuator spring 62 to move toward the lock stem 74, thereby placing the computer lock (A) in the unlocking position. As the lock assembly 7 is known and does not form any part of the present invention, the construction and operation of the lock assembly 7 is not detailed further hereinafter.

Figure 10:
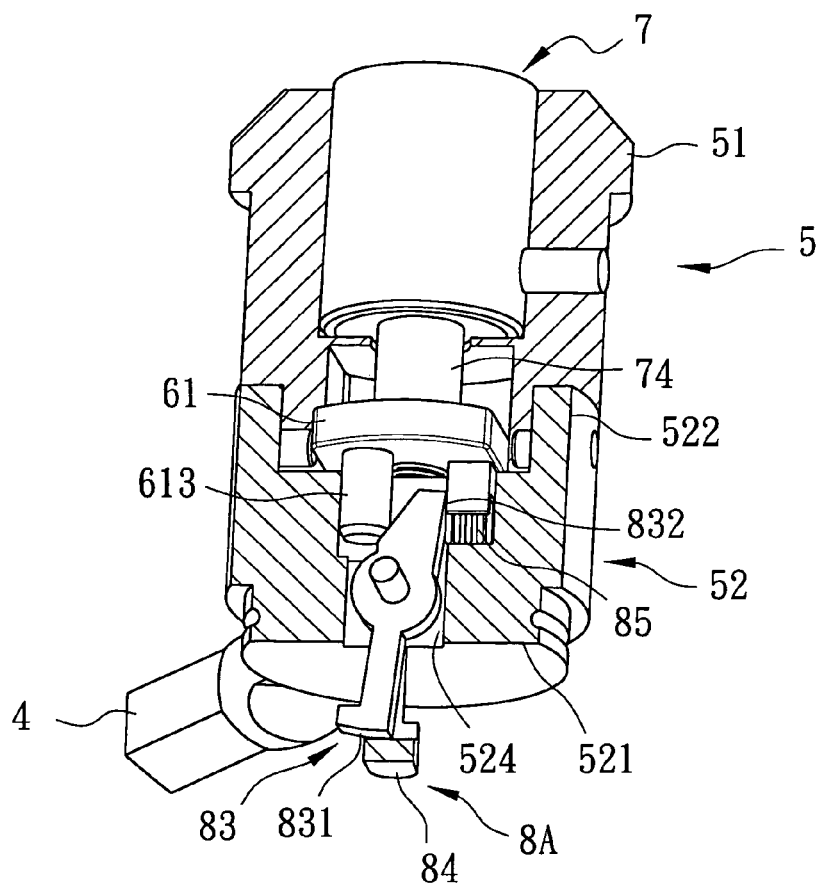
FIG. 10 is a perspective view showing the second preferred embodiment of the present invention with a housing of the computer lock being sectioned.
Figure 11:
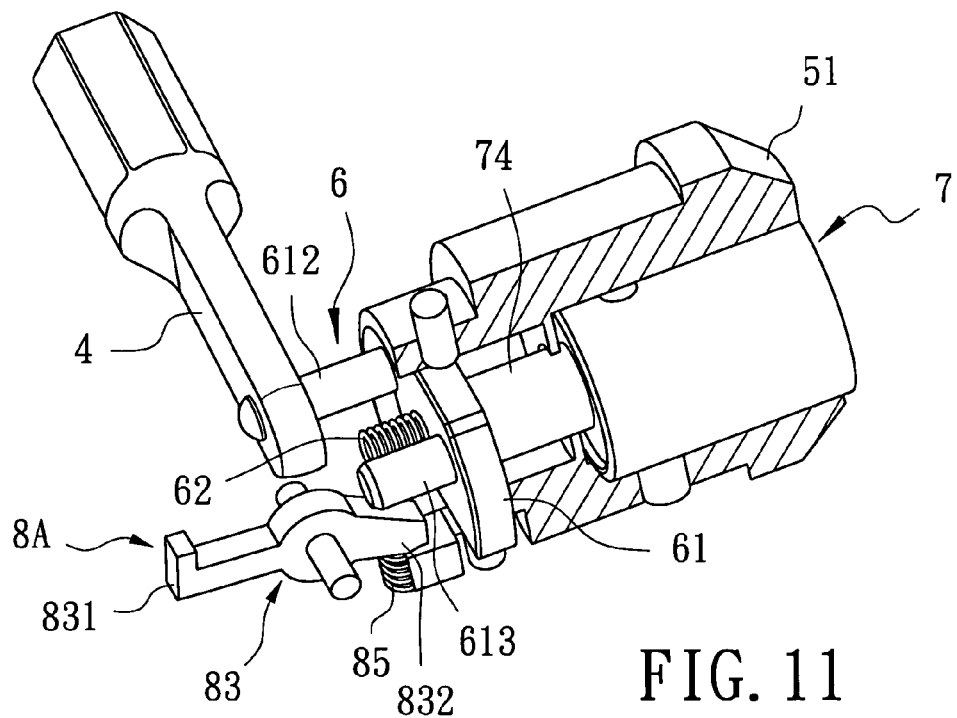
FIG. 11 is another perspective view showing the second preferred embodiment with a second shell of the housing being omitted.

Referring to FIGS. 10 and 11, there is shown the second preferred embodiment of the present invention, which differs from the first embodiment in having a different anchor unit 8A. The anchor unit 8A includes a moving arm 83 connected pivotally to the base wall 521 inside the through bore 524, a fixed arm 84 fixed to and projecting from the base wall 521 proximate to the through bore 524, and a biasing member 85 disposed between the moving arm 83 and the surrounding wall 522. The moving arm 83 has a hook end 831 and a driven end 832 opposite to the hook end 831. The biasing member 85 is a compression spring and biases the moving arm 83 to move the hook end 831 in a direction toward the fixed arm 84.

When the lock stem 74 is pressed to place the lock assembly 7 in the locking position, the moving seat 61 is pushed toward the base wall 521 by the lock stem 74 so that the driven end 832 of the moving arm 83 is driven by the push pin 613 and the hook end 831 is moved in a direction away from the hook end of the fixed arm 84 to an open position.

Figure 12:
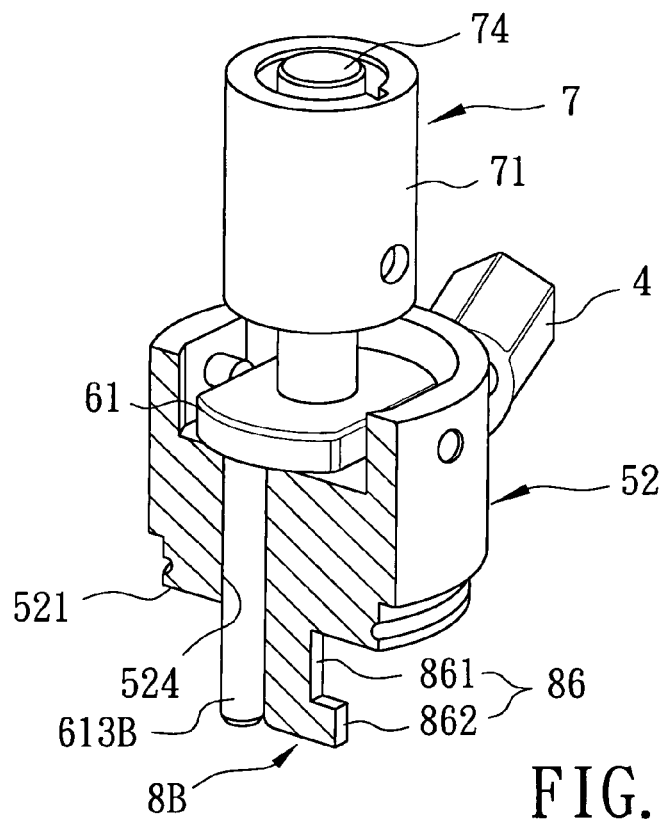
FIG. 12 is a perspective view showing the third preferred embodiment of the present invention with the first shell being omitted and the second shell being sectioned.
Figure 13:
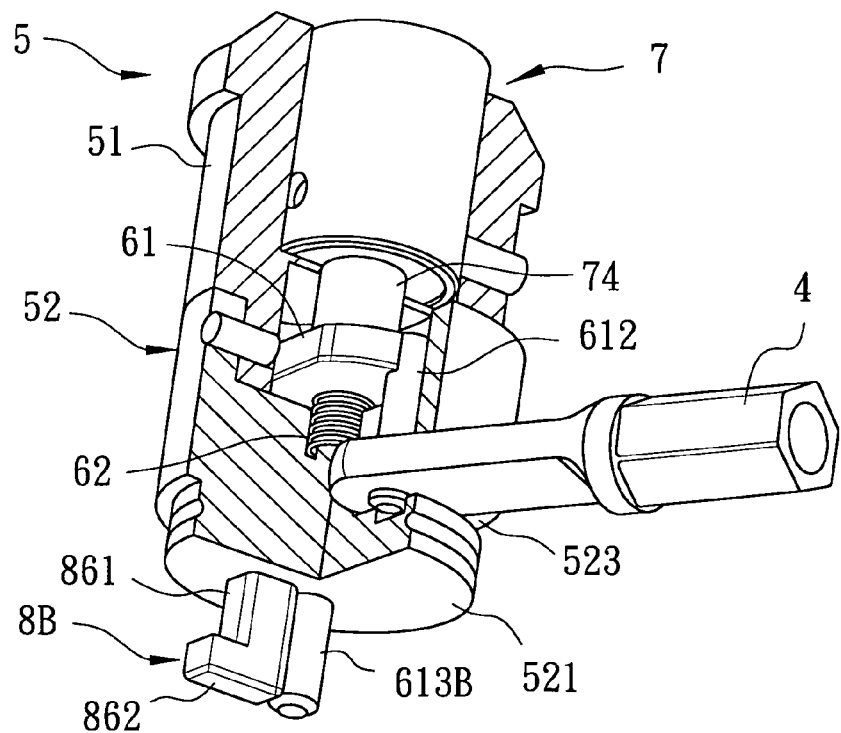
FIG. 13 is a perspective view showing the third preferred embodiment wherein both of the first and second shells are sectioned.

Referring to FIGS. 12 and 13, there is shown a third preferred embodiment of the present invention, which differs from the second preferred embodiment in having a different anchor unit 8B and a longer push pin 613B. The anchor unit 8B includes an anchor arm 86 fixed to and projecting from the base wall 521 proximate to the through bore 524. The anchor arm 86 has a stem 861 and a hook end 862. The cross-section of the stem 861 is larger than that of the hook end 862. The push pin 613B is long enough to extend out of the through hole 524 when the moving seat 61 is moved toward the base wall 521.

When the lock stem 74 is pressed to place the lock assembly 7 in the locking position, the moving seat 61 is pushed toward the base wall 521 by the lock stem 74 so that the push pin 613B moves out of the through bore 524 and is in juxtaposition with the anchor arm 86. As such, if, prior to pressing the lock stem 74, the anchor arm 86 is inserted into the hole 30 of the computer 3 shown in FIG. 3, the push pin 613B can extend into the hole 31 and push the hook end 862 of the anchor arm 86 to engage tightly the hole 31.

Figure 14:
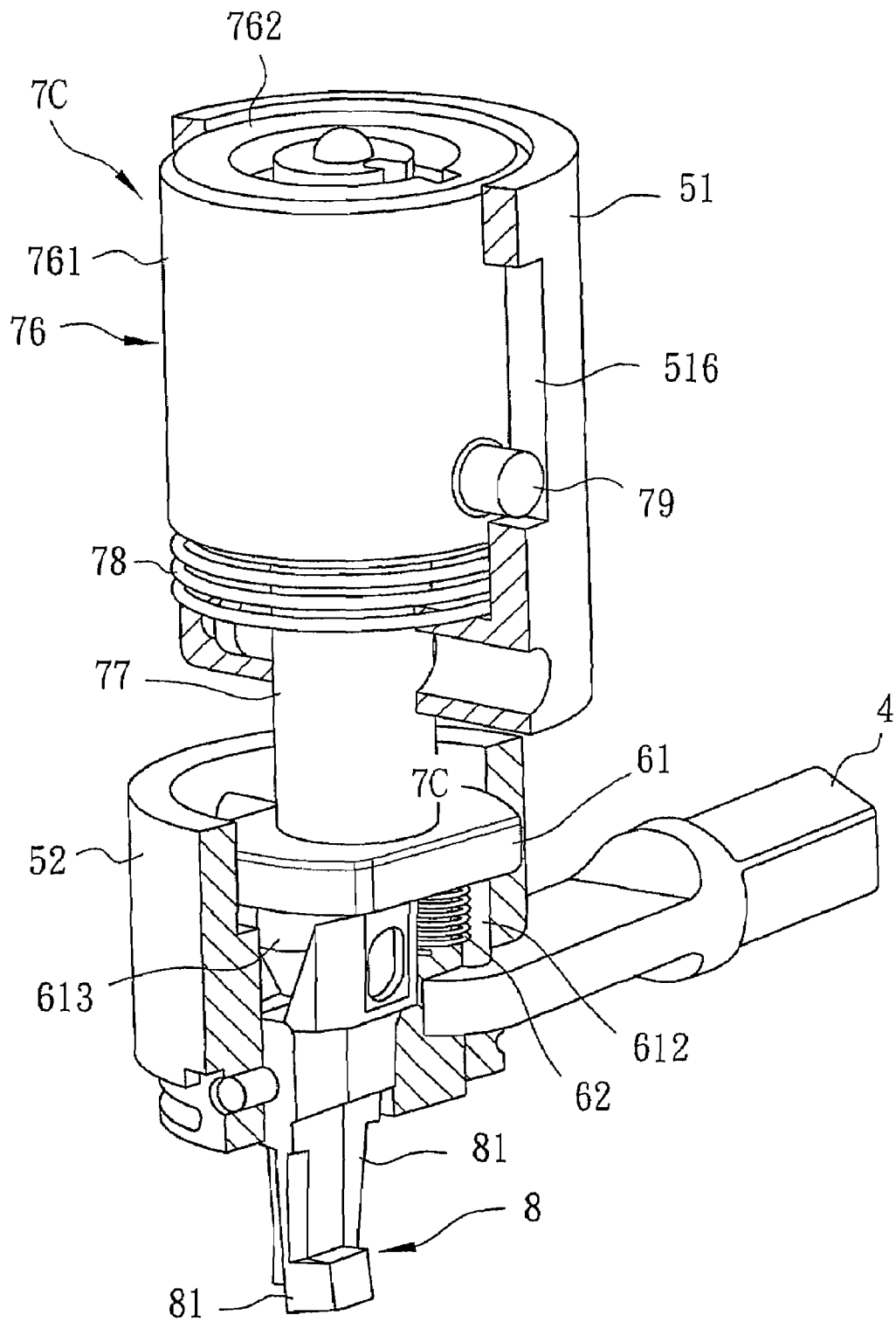
FIG. 14 is a perspective view showing the fourth preferred embodiment of the present invention in which the first and second shells are sectioned.
Figure 15:
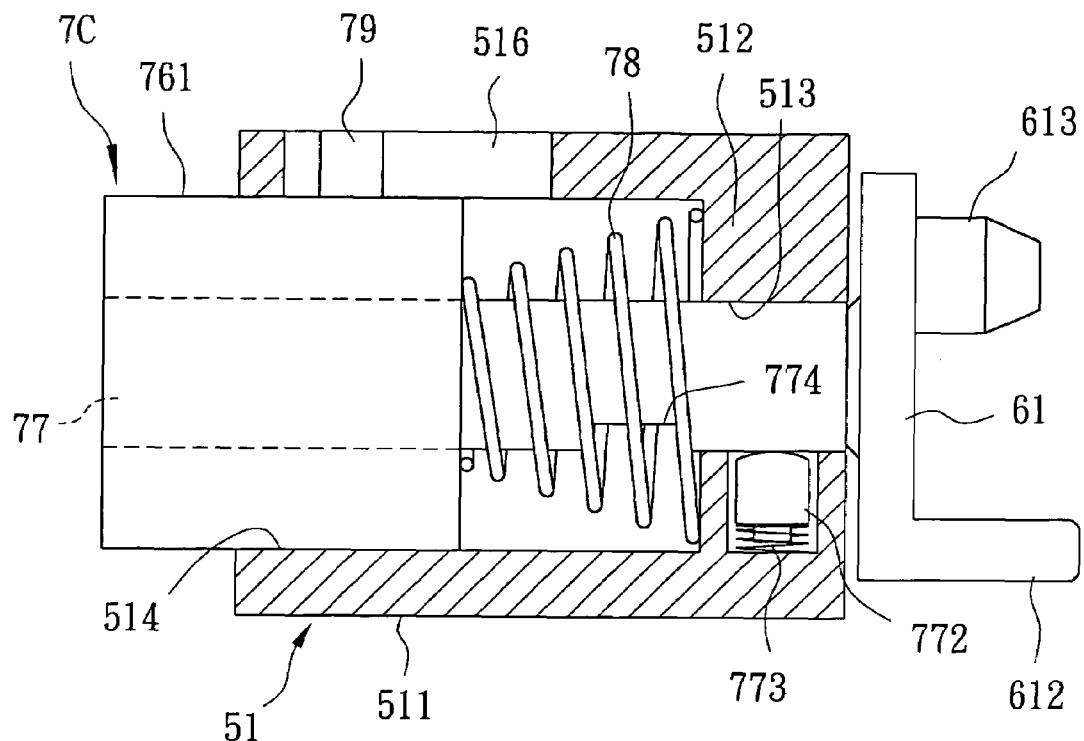
FIG. 15 is a sectional view of a portion of the fourth preferred embodiment.
Figure 16:
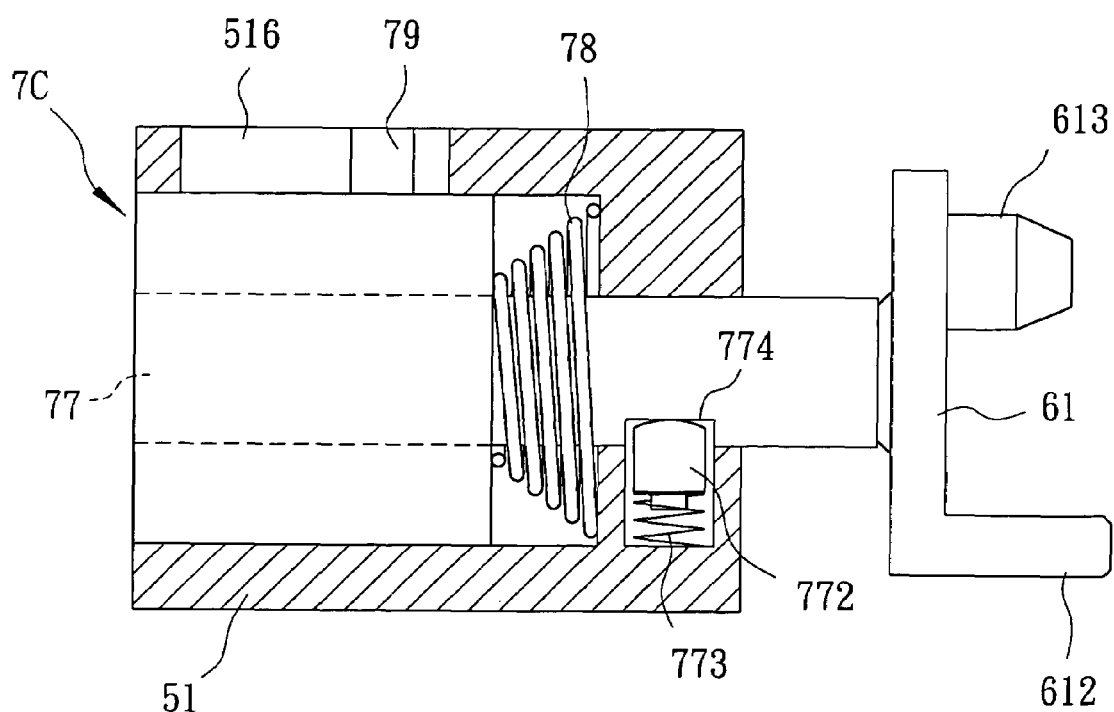
FIG. 16 is the same view as FIG. 15 but with a lock assembly being pressed inward.

Referring to FIGS. 14, 15 and 16, there is shown a fourth preferred embodiment of the present invention, which differs from the first preferred embodiment in having a different lock assembly 7C. The lock assembly 7C includes a known key-operated lock body 76 that has a lock shell 761 disposed movably inside the first compartment 514 of the first shell 51 and enclosing a core unit 762. A lock stem 77 is inserted into the core unit 762 and is connected to the moving seat 61. A returning spring 78 is sleeved around the lock stem 77 between the key-operated lock body 76 and the partition 512 and biases the key-operated lock body 76 to move out of the first shell 514. A slide pin 79 is disposed in a slide slot 516 of the first shell 51. The lock stem 77 extends through the slot 513 of the partition 512, and has an end to push the moving seat 61. A retaining groove 774 is formed in the lock stem 77. A retaining pin 772 is disposed in the partition 512 and is biased by an urging spring 773 to project into the slot 513 of the partition 512. When the retaining pin 772 is biased by the spring 773 to move into the retaining groove 774, the lock stem 77 is placed in the locking position.

When the lock assembly 7C is in the unlocking position, the lock body 76 projects outward from the first shell 51 by the action of the returning spring 78 (see FIG. 15). When the lock body 76 is pressed against the returning spring 78, the lock stem 77 together with the retaining groove 774 is moved until the retaining pin 772 engages the retaining groove 774 (see FIG. 18). As a result, the moving seat 61 is moved toward the base wall 521.

Figure 17:
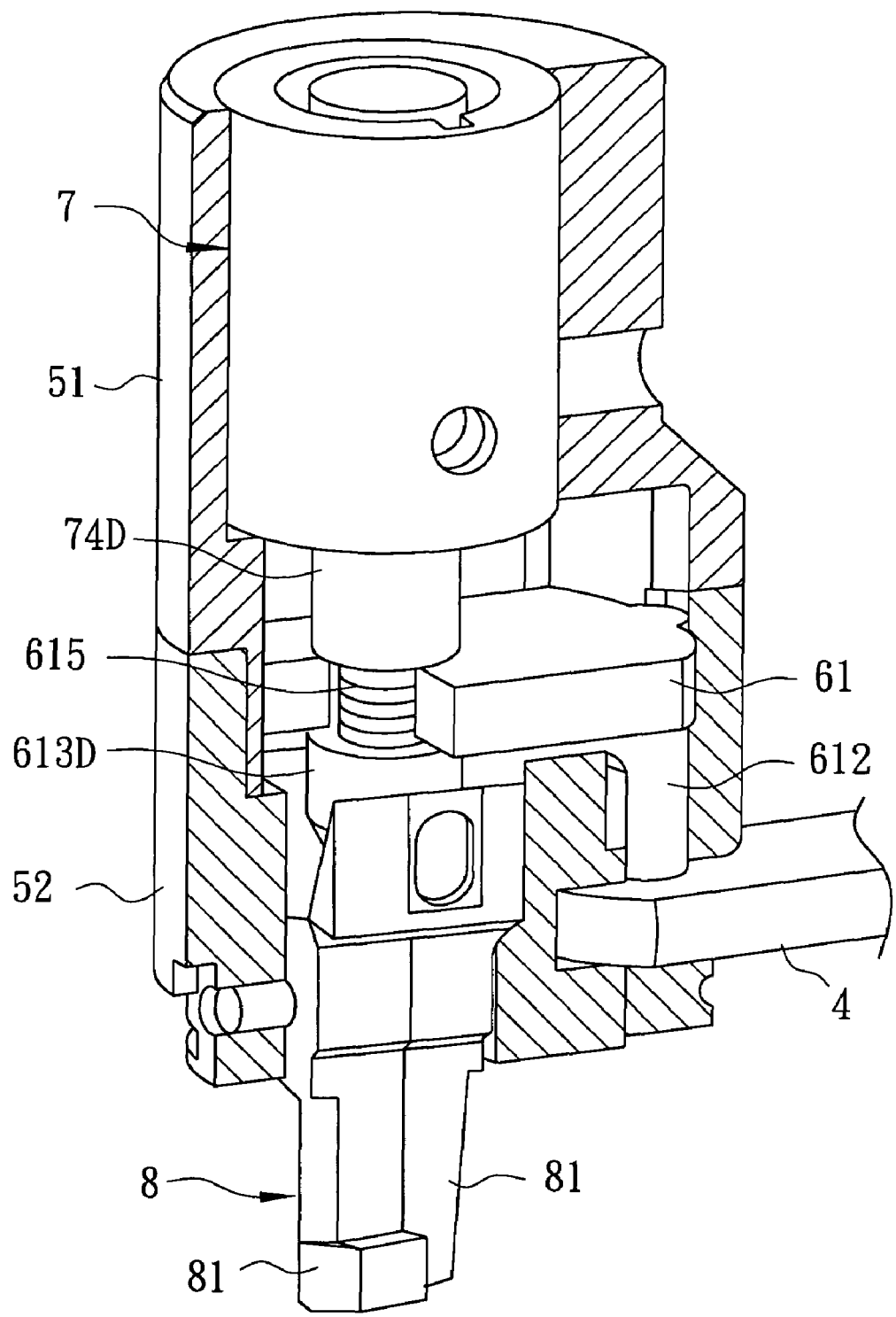
FIG. 17 is a perspective view showing the fifth preferred embodiment of the present invention with a portion thereof being removed.
Figure 18:
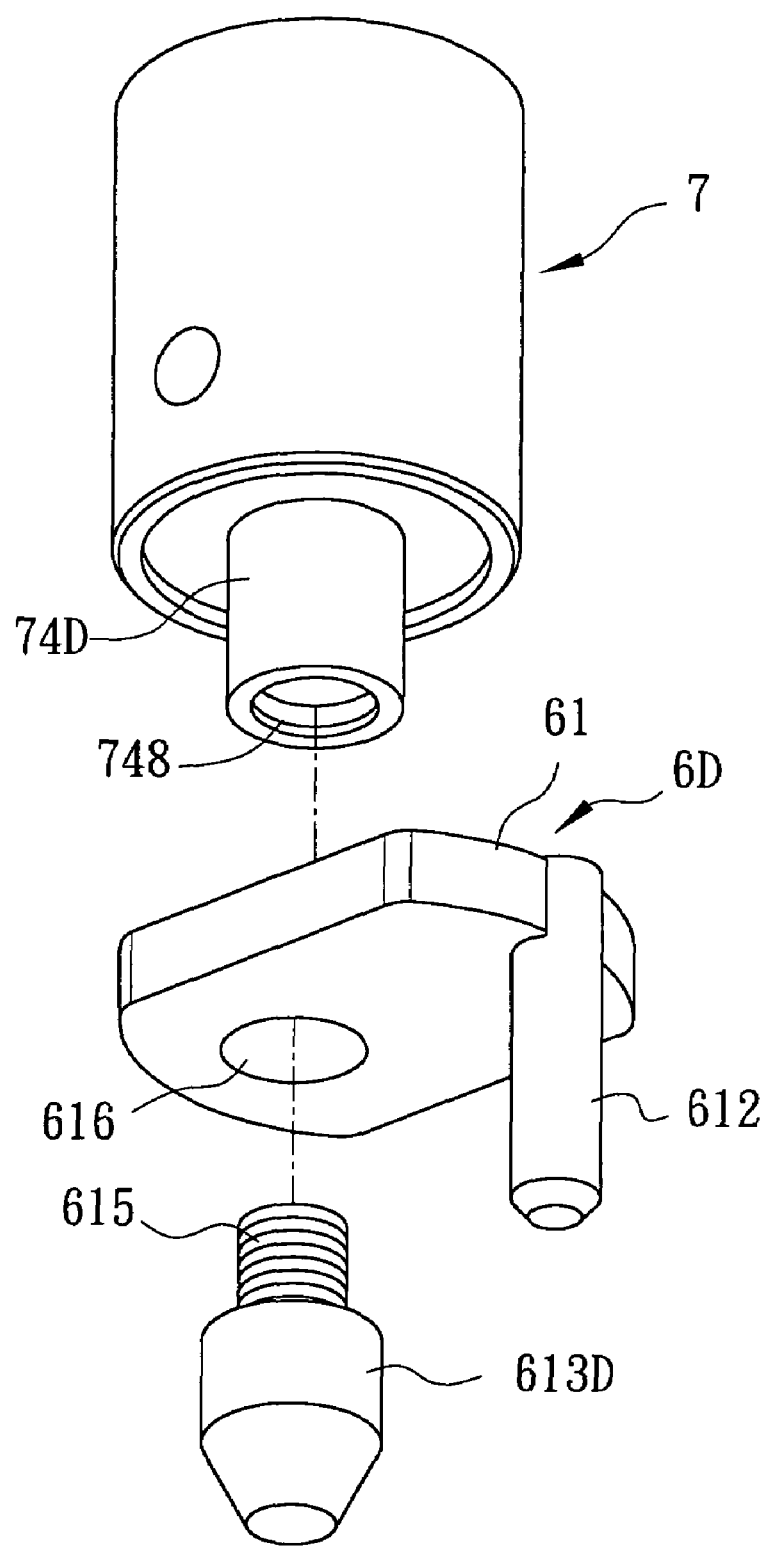
FIG. 18 is an exploded view showing the lock assembly, and the moving seat of the fifth preferred embodiment.

Referring to FIGS. 17 and 18, there is shown the fifth preferred embodiment of the present invention, which differs from the first preferred embodiment in that no actuator spring is provided for the actuator 6D and that the lock stem 74D has a screw hole 748 to couple with a screw rod 615 of a push pin 613D. The screw rod 615 extends through an aperture 616 formed in the moving seat 61 and engages threadedly the screw hole 748. Therefore, the lock stem 74D is secured to the moving seat 61 and the push pin 613D.

Figure 19:
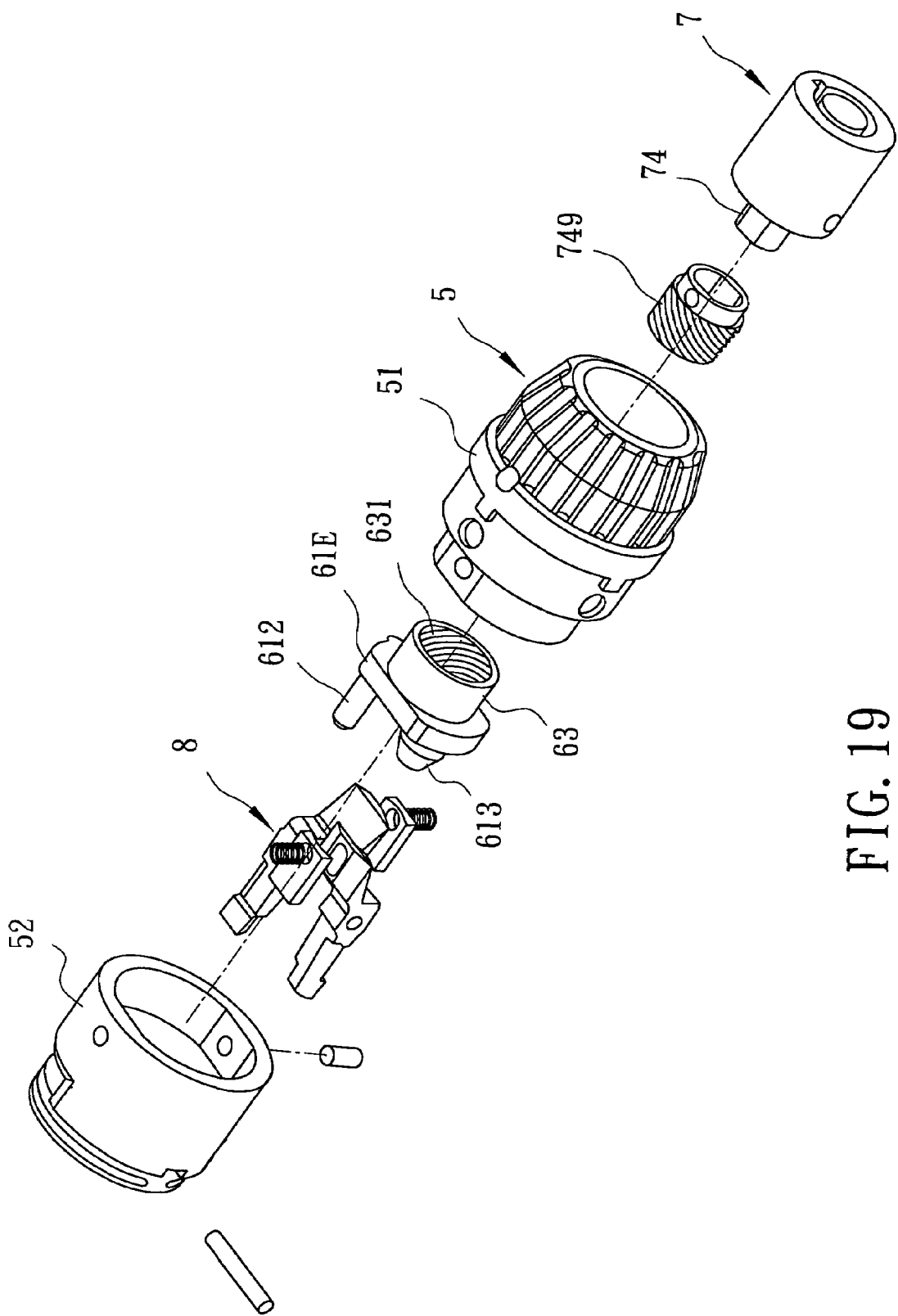
FIG. 19 is an exploded view of the sixth preferred embodiment of the present invention.
Figure 20:
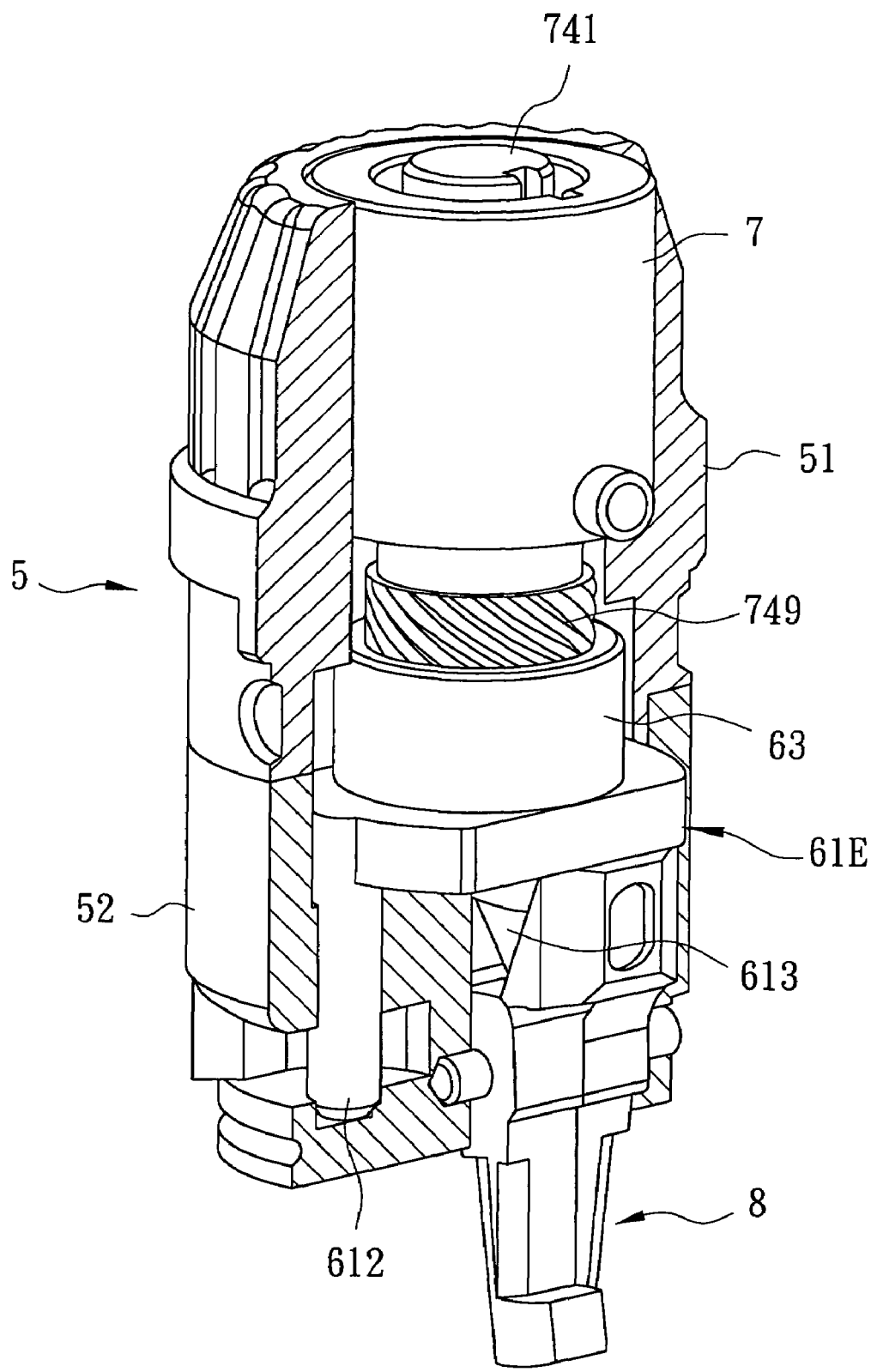
FIG. 20 is a perspective view showing the sixth preferred embodiment in which a portion of the housing is omitted.

Referring to FIGS. 19 and 20, there is shown the sixth preferred embodiment of the present invention, which differs from the first preferred embodiment in that the moving seat 61E is provided with a sleeve 63 having an internal thread 631 and that the lock stem 74 is provided with a screw member 749 having an external thread. The screw member 749 is inserted threadedly into the sleeve 63 so that the lock stem 74 is coupled to the moving seat 61E. In this embodiment, the screw member 749 is a separate piece from the lock stem 74, and is connected to the lock stem 74 through a transverse pin (not shown). However, it is contemplated that an external thread can be formed directly on the lock stem 74.

As mentioned above, the computer lock according to the present invention has the locking groove 523 and the penetrating pin 612 to receive and hold all of the end of the cable 4, the lug 30 of the desktop computer 3', and the wires of the mouse and the keyboard shown in FIG. 4, or to receive only the end of the cable 4 as shown in FIG. 3. Further, the anchor unit 8, 8A, 8B of the computer lock can be used to interlock with the hole 31 of the computer 3 shown in FIG. 3. Therefore, the computer lock according to the present Invention can be used to lock different types of computers and peripheral devices.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A computer lock comprising:
  a housing having first and second compartments disposed within said housing and communicated with each other, and a locking groove opening at an outer surface of said housing and adapted to receive an end of a fastening cable and/or a part of a computer;
  a lock assembly disposed in said first compartment and being operable by a key to move between locking and unlocking positions;
  an actuator disposed movably in said second compartment and actuated by said lock assembly to move toward said locking groove when said lock assembly is in said locking position, said actuator including a moving seat, and a penetrating pin and a push pin projecting from said moving seat, said penetrating pin extending into said locking groove from said second compartment when said lock assembly is in said locking position and being adapted to engage the end of the fastening cable and/or the part of the computer received in said locking groove; and an anchor unit that is disposed in said second compartment, that projects outwardly from said second compartment, and that is adapted to interlock with a hole of a computer, said anchor unit being controlled by said push pin to interlock with the hole of the computer when said lock assembly is in said locking position.

2. The computer lock as claimed in claim 1, wherein said lock assembly has a keyhole at one end of said housing, said housing having a base wall at another end of said housing opposite to said keyhole, said base wall having a through bore communicated with said second compartment and extending through an outer surface of said base wall, and a passage hole through which said penetrating pin extends into said locking groove, said locking groove extending in said base wall transversely of and intersecting said passage hole.

3. The computer lock as claimed in claim 2, wherein said lock assembly projects out of said housing in said unlocking position, and pushes said moving seat toward said base wall when said lock assembly is pressed inward in said locking position.

4. The computer lock as claimed in claim 3, wherein said anchor unit includes a pair of anchor arms each having a hook end extending outward through said through bore, and a driven end opposite to said hook end, each of said anchor arms connected pivotally to the other one of said anchor arms and to said base wall, said hook ends being normally biased to move toward each other, said hook ends moving away from each other when said push pin extends in between said driven ends in said locking position of said lock assembly.

5. The computer lock as claimed in claim 3, wherein said anchor unit includes a fixed arm fixed to and projecting outward from said base wall proximate to said through bore, a moving arm pivoted to said base wall within said through bore and having a hook end and a driven end opposite to said hook end, said driven arm being normally biased to move said hook end toward said fixed arm, said driven end being driven by said push pin to move said hook end away from said fixed arm in said locking position of said lock assembly.

6. The computer lock as claimed in claim 3, wherein said anchor unit includes an anchor arm fixed to and projecting outward from said base wall proximate to said through bore, said anchor arm having a hook end, said push pin being extendable out of said housing through said through bore, said push pin and said anchor arm being juxtaposed outside said housing when said push pin extends outward.

7. The computer lock as claimed in claim 3, wherein said housing further includes a partition disposed between said first and second compartments and having a slot intercommunicating said first and second compartments, said lock assembly including a key-operated lock body disposed in said first compartment, and a lock stem inserted into said key-operated lock body and extending through said slot, a returning spring disposed around said lock stem and between said lock body and said partition to bias said lock body to extend out of said first compartment.

8. The computer lock as claimed in claim 7, wherein said lock stem has a retaining groove, said housing having a retaining pin disposed in said partition and biased to project into said slot so as to engage said retaining groove when said key-operated lock body is pressed into said first compartment.

9. The computer lock as claimed in claim 3, wherein said lock assembly includes a key-operated lock body, and a lock stem inserted into said key-operated lock body, said lock stem having an end to push said moving seat, said actuator further having an actuator spring to bias said moving seat to move toward said lock stem.

10. The computer lock as claimed in claim 3, wherein said lock assembly includes a key-operated lock body, and a lock stem inserted into said key-operated lock body, said moving seat and said lock stem respectively having coupling members that couple together said moving seat and said lock stem.

11. The computer lock as claimed in claim 10, wherein said coupling members respectively have internal and external threads.

* * * * *

UNITED STATES PATENT AND TRADEMARK OFFICE
CERTIFICATE OF CORRECTION

PATENT NO. : 7,308,809 B2  Page 1 of 1
APPLICATION NO. : 11/511949
DATED : December 18, 2007
INVENTOR(S) : Francisco Lu It is certified that error appears in the above-identified patent and that said Letters Patent is hereby corrected as shown below:

On The Title Page, Item (75)

Please insert --Kaohsiung--.

Signed and Sealed this

Twenty Second Day of April, 2008

JON W. DUDAS
*Director of the United States Patent and Trademark Office*